(12) United States Patent
Kasar et al.

(10) Patent No.: US 12,596,254 B2
(45) Date of Patent: Apr. 7, 2026

(54) HEAD-MOUNTABLE DEVICE WITH CONNECTABLE ACCESSORIES

(71) Applicant: Apple Inc., Cupertino, CA (US)

(72) Inventors: Darshan R. Kasar, San Francisco, CA (US); Leah M. Cohen, Dallas, TX (US); Cameron A. Harder, San Francisco, CA (US); John Raff, Menlo Park, CA (US); Paul X. Wang, Cupertino, CA (US); David A. Kalinowski, Davis, CA (US)

(73) Assignee: Apple Inc., Cupertino, CA (US)

( * ) Notice: Subject to any disclaimer, the term of this patent is extended or adjusted under 35 U.S.C. 154(b) by 389 days.

(21) Appl. No.: 18/124,491

(22) Filed: Mar. 21, 2023

(65) Prior Publication Data

US 2023/0305301 A1     Sep. 28, 2023

Related U.S. Application Data

(63) Continuation of application No. PCT/US2021/044509, filed on Aug. 4, 2021.
(Continued)

(51) Int. Cl.
*G02B 27/01* (2006.01)
*G02C 5/00* (2006.01)
(Continued)

(52) U.S. Cl.
CPC ........... *G02B 27/017* (2013.01); *G02C 5/001* (2013.01); *G02C 5/20* (2013.01); *G02C 11/10* (2013.01); *G02B 2027/0138* (2013.01); *G02B 2027/014* (2013.01); *G02B 2027/0178* (2013.01); *G02B 2027/0187* (2013.01)

(58) Field of Classification Search
CPC .......... G02B 27/017; G02B 2027/0138; G02B 2027/014; G02B 2027/0178; G02B 2027/0187; G02B 27/0176; G02C 5/001; G02C 5/20; G02C 11/10
See application file for complete search history.

(56) References Cited

U.S. PATENT DOCUMENTS

2008/0143954 A1* 6/2008 Abreu ...................... G06F 3/167
                                                          351/158
2010/0149073 A1  6/2010 Chaum et al.
(Continued)

OTHER PUBLICATIONS

International Preliminary Report on Patentability from PCT/US2021/044509, dated Mar. 28, 2023, 8 pages.

*Primary Examiner* — Mariam Qureshi
(74) *Attorney, Agent, or Firm* — BAKERHOSTETLER

(57) ABSTRACT

Head-mountable devices can include connection mechanisms that provide adjustable and exchangeable connections with other devices to enhance performance of the head-mountable device. Such connections can provide both mechanical engagement and operable communication between the connected devices. Accessory devices and/or external devices can be easily connected to provide different components and functions at different times as desired. Accordingly, a main portion of the head-mountable device need not include permanent components that provide every function that will later be desired by the user. Instead, the head-mountable device can have expanded and customizable capabilities by the use of one or more accessory devices.

20 Claims, 11 Drawing Sheets

Related U.S. Application Data

(60) Provisional application No. 63/081,781, filed on Sep. 22, 2020.

(51) Int. Cl.
G02C 5/20 (2006.01)
G02C 11/00 (2006.01)

(56) References Cited

U.S. PATENT DOCUMENTS

| | | | |
|---|---|---|---|
| 2015/0002374 A1* | 1/2015 | Erinjippurath | G06T 15/08 |
| | | | 345/8 |
| 2018/0004297 A1* | 1/2018 | Xu | G06T 19/006 |
| 2018/0239150 A1* | 8/2018 | Yoshida | G02B 27/0172 |
| 2023/0049355 A1* | 2/2023 | Lee | G02B 27/0176 |
| 2024/0094556 A1* | 3/2024 | Villalpando | G02C 5/14 |

* cited by examiner

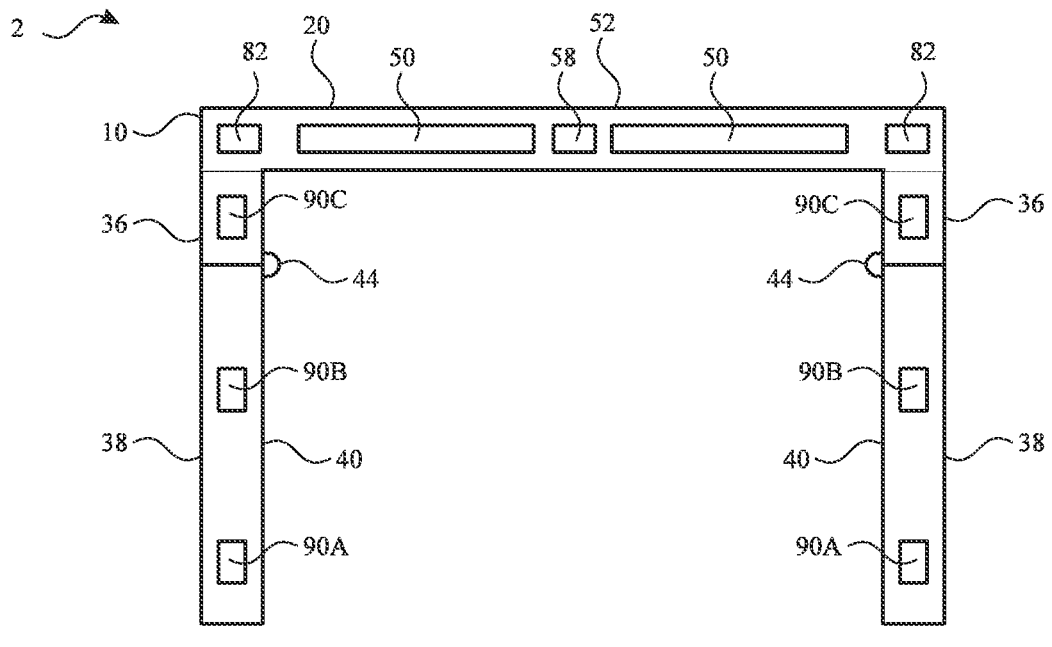
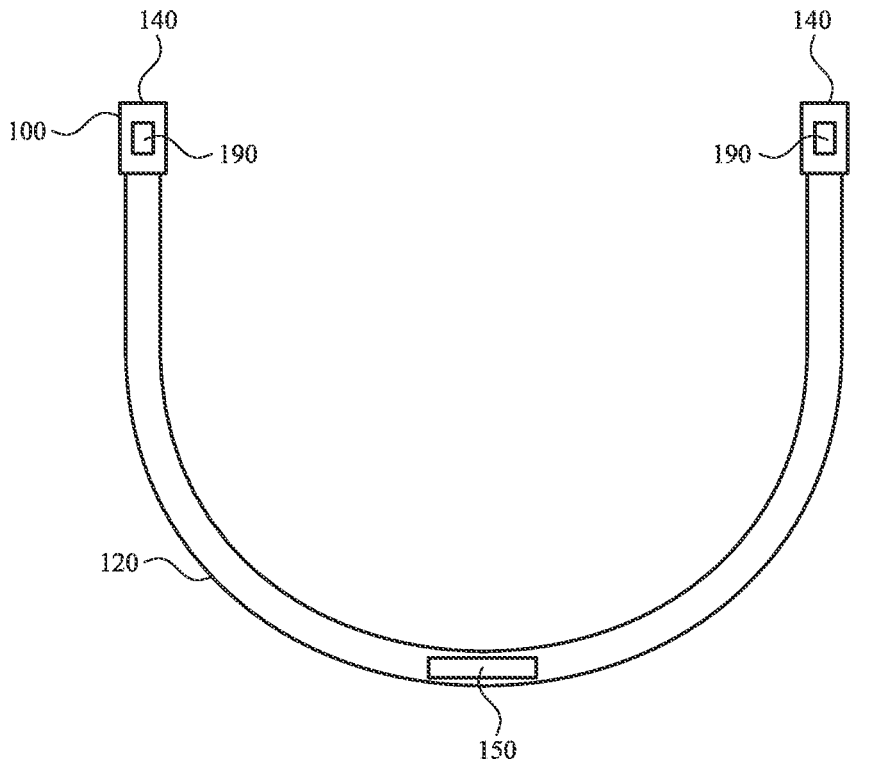
*FIG. 1*

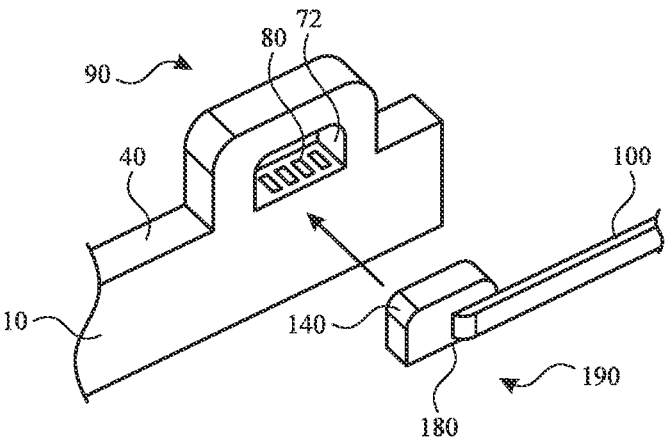
FIG. 9
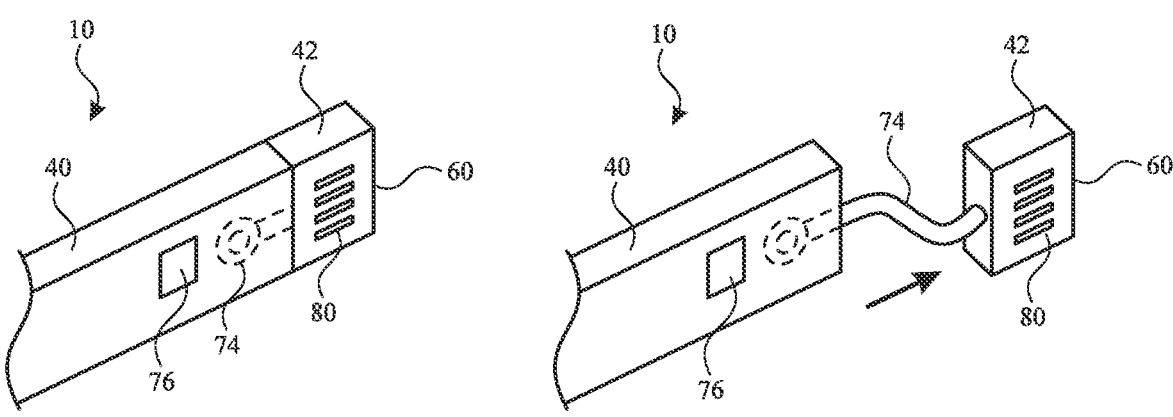
FIG. 10                    FIG. 11

HEAD-MOUNTABLE DEVICE WITH CONNECTABLE ACCESSORIES

CROSS-REFERENCE TO RELATED APPLICATIONS

This application is a continuation of International Application No. PCT/US2021/0044509, entitled "HEAD-MOUNTABLE DEVICE WITH CONNECTABLE ACCESSORIES," filed Aug. 4, 2021, which claims the benefit of U.S. Provisional Application No. 63/081,781, entitled "HEAD-MOUNTABLE DEVICE WITH CON-NECTABLE ACCESSORIES," filed Sep. 22, 2020, the entirety of which is incorporated herein by reference.

TECHNICAL FIELD

The present description relates generally to head-mountable devices, and, more particularly, to head-mountable devices with connectable accessories.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

FIG. 1 illustrates a top view of a head-mountable device and an accessory device, in accordance with embodiments of the present disclosure.

FIG. 9 illustrates an enlarged perspective view of a head-mountable device for connection with an accessory device, in accordance with embodiments of the present disclosure.

FIG. 10 illustrates an enlarged perspective view of a head-mountable device with a connector in a retracted configuration, in accordance with embodiments of the present disclosure.

FIG. 11 illustrates an enlarged perspective view of the head-mountable device of FIG. 10 with the connector in an extended configuration, in accordance with embodiments of the present disclosure.

DETAILED DESCRIPTION

Figure 2:
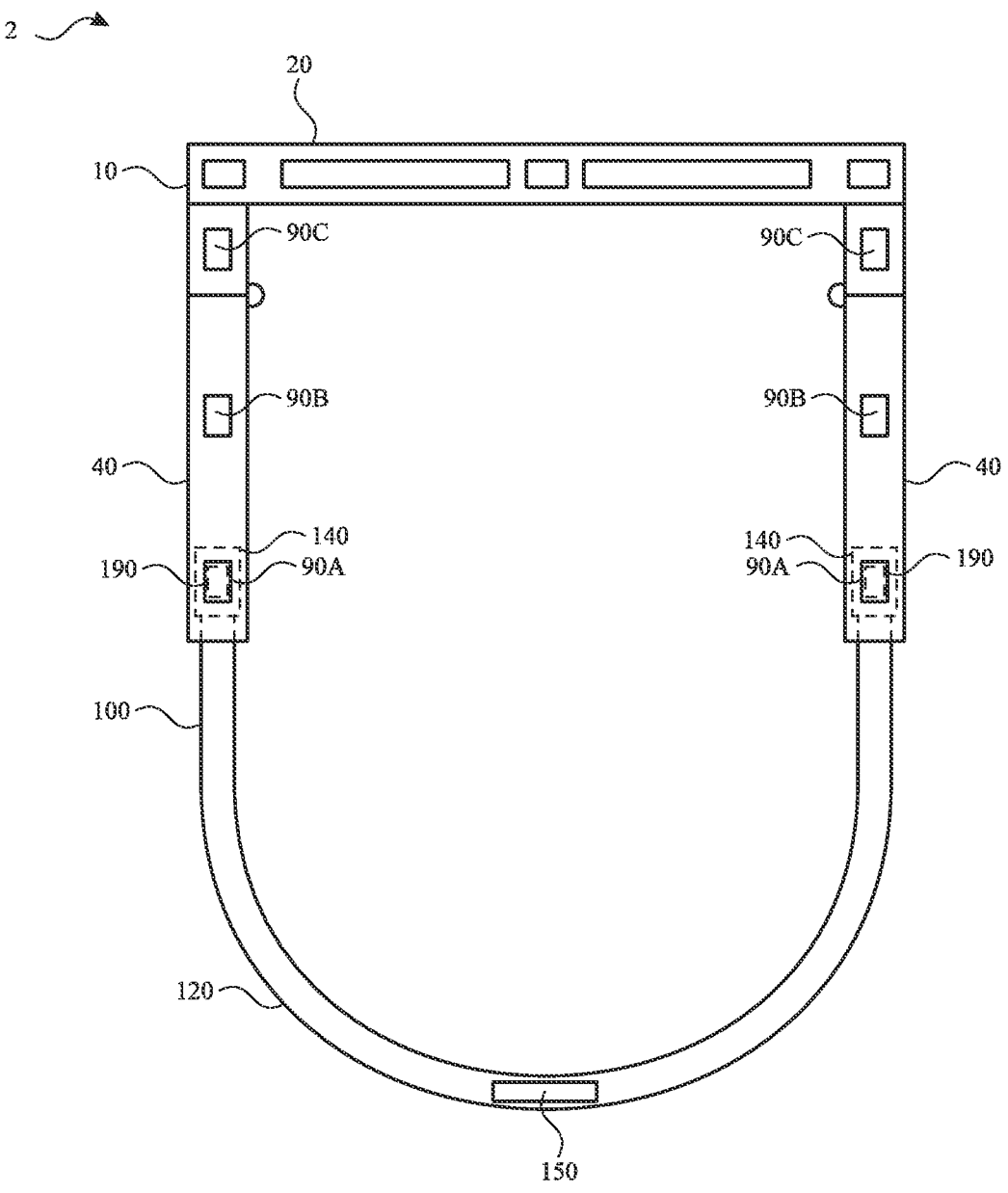
FIG. 2 illustrates a top view of the head-mountable device and the accessory device of FIG. 1 with the accessory device connected to the head-mountable device, in accordance with embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mounted displays, headsets, visors, smartglasses, head-up display, etc., can perform a range of functions that is determined by the components (e.g., sensors, circuitry, and other hardware) included with the wearable device as manufactured. However, space, cost, and other considerations may limit the ability to provide every component that might provide a desired function. For example, different users may have different preferences regarding the components and functions that are provided by a given head-mountable device. Some users may desire certain capabilities, such as high-resolution display and long battery life, while other users may desire other capabilities, such as smaller form factor. Furthermore, a given user may desire different functions at different times. For example, a given user may desire high-resolution display at home and long battery life when outside the home.

Given the diversity of desired components and functions, it would be beneficial to allow a user to modify components and functions of a head-mountable device to customize the user experience according to the user's desires. Head-mountable devices of the present disclosure facilitate customization, adaptability, and modification by a user according to the user's desires.

Head-mountable devices of the present disclosure can include connection mechanisms that provide adjustable and exchangeable connections with other devices to enhance performance of the head-mountable device. Such connections can provide both mechanical engagement and operable communication between the connected devices. Accessory devices and/or external devices can be easily connected to provide different components and functions at different times as desired. Accordingly, a main portion of the head-mountable device need not include permanent components that provide every function that will later be desired by the user. Instead, the head-mountable device can have expanded and customizable capabilities by the use of one or more accessory devices.

These and other embodiments are discussed below with reference to FIGS. 1-15. However, those skilled in the art will readily appreciate that the detailed description given herein with respect to these Figures is for explanatory purposes only and should not be construed as limiting.

According to some embodiments, for example as shown in FIG. 1, a system 2 can include a head-mountable device 10 the includes a frame 20 that is worn on a head with one or more arms 40. The frame 20 can be positioned in front of the eyes of a user to provide information within a field of view of the user. The frame 20 can provide nose pads or another feature to rest on a user's nose. The frame 20 further includes one or more optical modules 50 and a bridge 32 above the nose pads and connecting multiple optical modules 50.

The frame 20 and/or the arms 40 can serve to surround a peripheral region of the head-mountable device 10 as well as support any internal components in their assembled position. For example, the frame 20 and/or the arms 40 can enclose and support various internal components (including for example integrated circuit chips, processors, sensors, input/output devices, memory devices, and other circuitry) to provide computing and functional operations for the head-mountable device 10, as discussed further herein.

An optical module 50 can transmit light from a physical environment for viewing by the user. Such an optical module 50 can include optical properties, such lenses for vision correction based on incoming light from the physical environment. Additionally or alternatively, an optical module 50 can provide information as a display within a field of view of the user. Such information can be displayed based on operation of a display element 82 that projects light onto and/or communicates with one or more elements of the optical module 50. As shown in FIG. 1, the display element 82 can reside, at least partially, in one or more of the arms 40 and/or in the frame 20. For example, the display element 82 can reside, at least partially, within a cavity extending from the frame 20 and into the arm 40. Displayed information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, a frame 20 can be supported on a user's head with the arms 40. The arms 40 can wrap or extend along opposing sides of a user's head, as with temple components 36. The arms 40 can further include earpieces 38 for wrapping around or otherwise engaging a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, an arm can extend about a user's head to both sides of the frame 20.

The frame 20 can be coupled to or integral (e.g., monolithic) with one or more of the arms 40, including the temple components 36 and/or the earpieces 38. For example, a continuous support structure including the frame 20 can support the optical modules 50 as well as the display elements 82. While at least a portion of the arms 40 can optionally move (e.g., the earpieces 38 pivot about a hinge 44 and relative to the temple components 36) with respect to the frame 20, it will be understood that, in at least some embodiments, the frame 20 and/or the arms 40 can form a continuous structure that supports both the optical modules 50 as well as the display elements 82 to facilitate relative alignment of the optical modules 50 and their corresponding display element 82. As such, the arms 40 can refer to at least a portion of the support structure (e.g., temple components 36) that extends away from the portion of the frame 20 and that supports the optical modules 50.

In some embodiments, each of the optical modules 50 can include the display element 82 (e.g., a light projector) and a waveguide. The display element 82 can include any and all components for projecting light in the desired manner. For example, the display element 82 can include light sources, such as an RGB module, polarizers, beam splitters, collimators, lenses, and the like. The optical modules 50 can include a waveguide that allows internal reflections of received light, as well as one or more other optical components, such as corrective lenses.

Systems 2 of the present disclosure provide a head-mountable device with an attachable, removable, and/or exchangeable accessory device 100 that provide a variety of different components and functions to achieve the results that are desired by a user. As shown in FIG. 1, the accessory device 100 can be separate from but connectable to the head-mountable device 10. The head-mountable device 10 can include one or more HMD connectors 90A-C for mechanically and operably (e.g., communicatively) connecting to the accessory device 100. For example, the head-mountable device 10 can include HMD connectors 90A-C at the arms 40 and/or the frame 20. The accessory device 100 can include accessory connectors 190, each being configured to mechanically and operably connect to a corresponding one of the HMD connectors 90A-C. The accessory connectors 190 of the accessory device 100 can be located at end portions 140 of the accessory device 100. For example, the accessory device 100 can include a pair of end portions 140 that are connected to each other by a tether 120. Optionally, the accessory device 100 can include one or more accessory components 150 that provide functions to the head-mountable device 10 when connected thereto, as described further herein.

As used herein, "accessory" can refer to a characteristic that allows an item, such as an accessory device, to be connected, installed, removed, swapped, and/or exchanged by a user in conjunction with a head-mountable device. It will be understood that the head-mountable device can be operable with or without use of the accessory device and that the accessory device can provide additional functionality to the head-mountable device when installed. Connection of an accessory device with a head-mountable device can be performed and reversed, followed by disconnection and connection of another accessory device with the same head-mountable device or another head-mountable device with the same accessory device. As such, multiple accessory devices can be exchangeable with each other with respect to a given head-mountable device. Further, multiple head-mountable devices can be exchangeable with each other with respect to a given accessory device.

An accessory device can be connected to a head-mountable device in a manner that allows the accessory device to be removed thereafter. The connection can be fully reversible, such that when the accessory device and the head-mountable device are disconnected, each is restored to a condition held prior to the connection. The connection can be fully repeatable, such that after the accessory device and the head-mountable device are disconnected, the same or a different head-mountable device and accessory device pair can be connected in the same way. The accessory device and head-mountable device can be securely and temporarily connected, rather than permanently, fixedly, or resiliently connected (e.g., via chemical and/or molecular bond). For example, connection and disconnection of the accessory device and head-mountable device are facilitated in a manner that does not cause permanent damage, harm, or deformation to the accessory device or the head-mountable device.

An accessory device can be connected to and disconnected from a head-mountable device with ease by a user. The connection and/or disconnection can be achieved repeatedly and reversibly by hand, rather than requiring a tool.

For example, a locking mechanism and/or a release mechanism can be provided on the accessory device and/or the head-mountable device for ready access by a user. A force required by a user to connect and/or disconnect the accessory device and the head-mountable device can be within a typical range for a user's fingers. For example, a force required to connect and/or disconnect the accessory device and the head-mountable device can be less than 1 N, 5 N, 10 N, 15 N, 20 N, 25 N, or 30 N. Additionally or alternatively, connection and/or disconnection can be achieved and/or facilitated by use of a tool.

Referring now to FIGS. 1 and 2, a head-mountable device can be provided with one or more accessory devices for further enhancing functionality of the head-mountable device. For example, an accessory device 100 can be attached and operably connected, for example, to the arms 40. While a single accessory device 100 is shown in FIGS. 1 and 2, it will be understood that the description herein can apply to any number of accessory device 100 simultaneously or alternately connected to the head-mountable device 10.

The accessory device 100 can be connected to HMD connectors 90A-C at any portion of the head-mountable device 10, such as the arms 40 and/or the frame 20. For example, HMD connectors 90A-C can be provided on an inner, outer, top, bottom, front, or rear side of the arms 40 and/or the frame 20.

As shown in FIGS. 1 and 2, the accessory device 100 can attach to the head-mountable device 10 with HMD connectors 90A-C and accessory connectors 190. Attachment can be achieved with an engagement that holds end portions 140 of the accessory device 100 in place relative to the head-mountable device 10 until controlled release, for example by a user.

An electrical or other communication connection can be made and maintained upon mechanical securement of the HMD connectors 90A-C and the accessory connectors 190, for example via an HMD communication interface and an accessory communication interface. When the head-mountable device 10 is connected to the accessory device 100, components thereof can be in operative communication. For example, components of the accessory device 100 can be in operative communication with components of the head-mountable device 10. By further example, components of the head-mountable device 10 (e.g., in separate arms) can be in operative communication with each other via the accessory device 100.

As further shown in FIG. 2, the accessory device 100 can provide securement to a head of the user while the head-mountable device 10 is worn on the head and/or retention when the head-mountable device 10 is taken off of the head. For example, the head-mountable device 10 can be worn in front of the eyes of the user and along the sides of the user's head. The accessory device 100 can wrap around the back of the user's head with a tether 120 to secure the head-mountable device 10 from moving forward off of the user's face. By further example, the accessory device 100 can have sufficient length to drop below the user's head, such as to the back of the user's neck. In such an arrangement, the head-mountable device 10 can be taken off of the face of the user and a tether 120 of the accessory device 100 can wrap around the neck of the user and retain the head-mountable device 10 when the user intentionally or inadvertently releases it.

Figure 3:
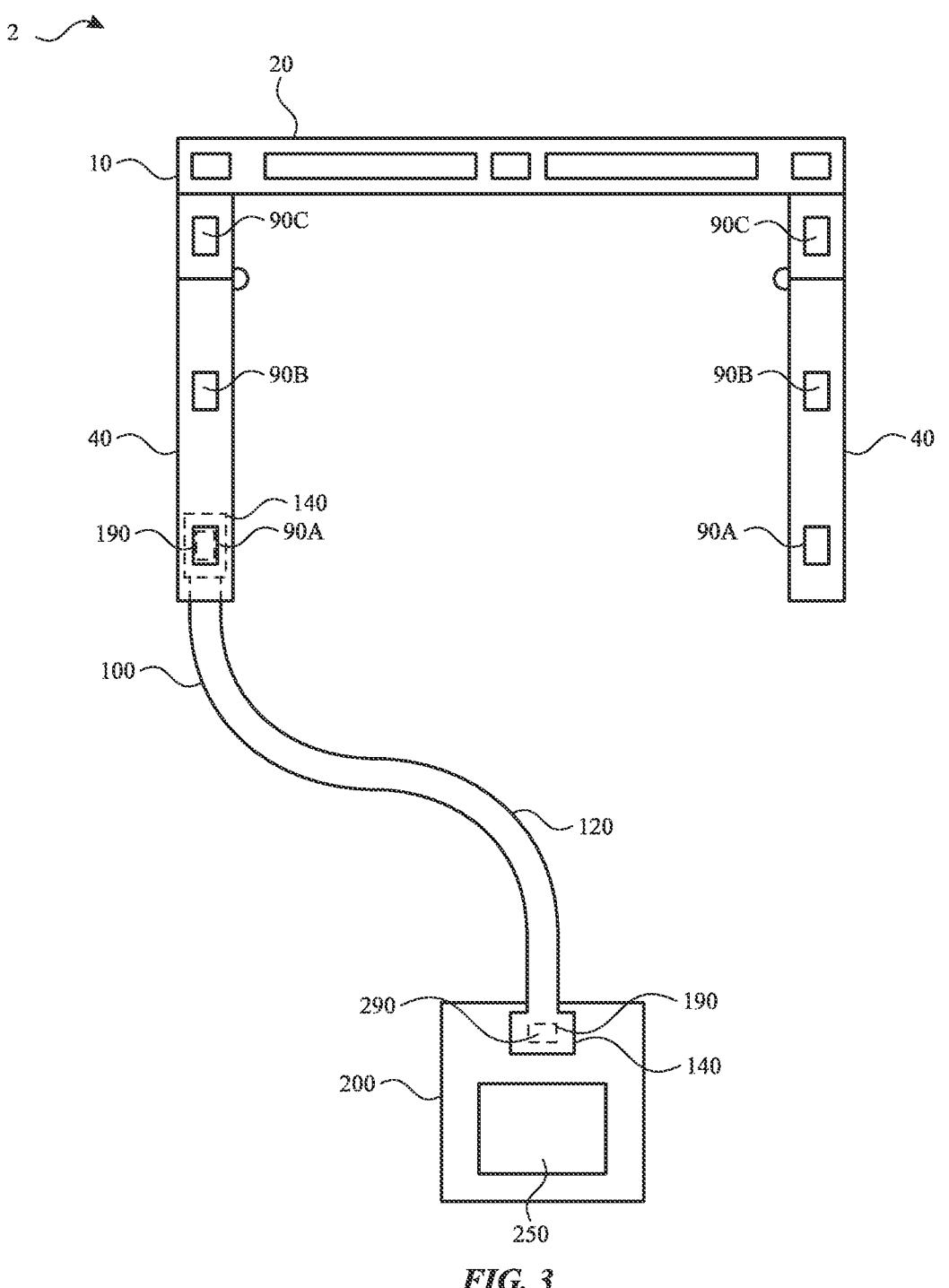
FIG. 3 illustrates a top view of a head-mountable device connected by an accessory device to an external device, in accordance with embodiments of the present disclosure.

Referring now to FIG. 3, components of the head-mountable device 10 can be in operative communication with components of an external device 200 via the accessory device 100. As shown in FIG. 3, the accessory device 100 can provide the first end portion 140 having a first accessory connector 190 that is connected to one of the HMD connectors 90A-C of the head-mountable device 10. The accessory device 100 can further provide a second end portion 140 having a second accessory connector 190 that is connected to an external connector 290 of an external device 200. The external device 200 can include one or more external components 250 that provide functions to the head-mountable device 10 and/or the accessory device 100 when connected thereto, as described further herein.

The accessory connector 190 of the accessory device 100 that is connected to the external connector 290 of an external device 200 can be the same connector that is connectable to one of the HMD connectors 90A-C of the head-mountable device 10. As such, the same accessory device 100 can be used in multiple configurations. For example, in a first configuration such as is shown in FIG. 2, each of the accessory connectors 190 is engaged to a corresponding one of the HMD connectors 90A-C to provide operable communication between the arms 40 of the head-mountable device 10. By further example, in a second configuration such as is shown in FIG. 3, a first one of the accessory connectors 190 is engaged to one of the HMD connectors 90A-C, and a second one of the accessory connectors 190 is engaged to an external connector 290 of the external device 200 to provide operable communication between the head-mountable device 10 and the external device 200. It will be understood that the system 2 can alternate between such arrangements to receive the benefits of either one at any given time.

While different accessory devices and/or external devices can provide different features and/or functions, multiple accessory devices and/or external devices can be exchangeable with each other by providing at least some features that are similar or the same among the multiple accessory devices and/or external devices. For example, different accessory devices and/or external devices can be secured by the same securement mechanism. By further example, different accessory devices and/or external devices can establish a communication link via the same communication mechanism. Accordingly, a head-mountable device can accommodate the exchange of different accessory devices and/or external devices by providing the same securement mechanism and communication mechanism across the different accessory devices and/or external devices. Likewise, an accessory device and/or external device can accommodate the exchange of different head-mountable devices by providing the same securement mechanism and communication mechanism across the different head-mountable devices.

Figure 4:
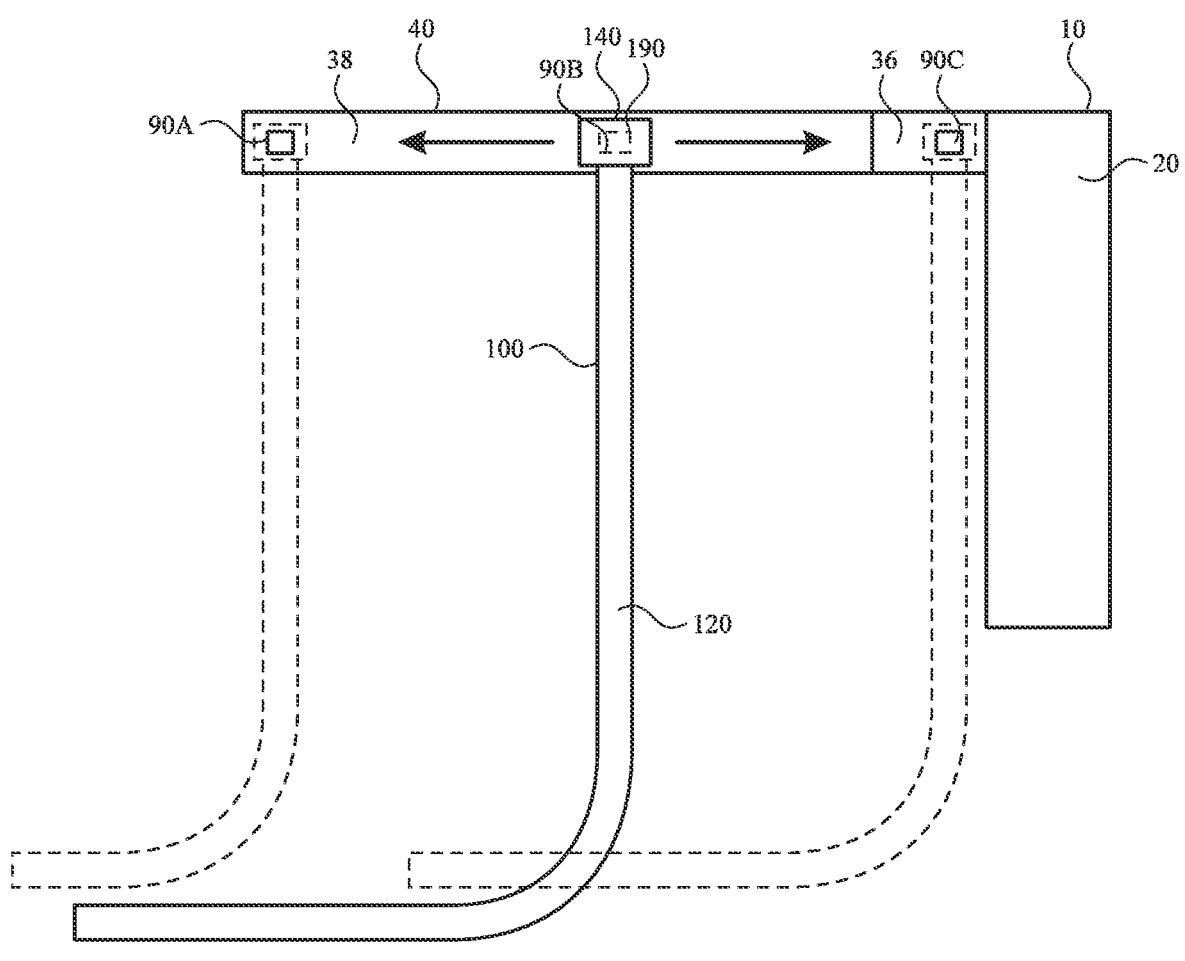
FIG. 4 illustrates a side view of a head-mountable device with an accessory device connected in one of multiple configurations, in accordance with embodiments of the present disclosure.

Referring now to FIG. 4, multiple HMD connectors 90A-C can be provided on each of the arms 40 of the head-mountable device 10. As shown in FIG. 4, each of the HMD connectors 90A-C can be distributed along the length of the arm 40. At least one of the HMD connectors 90A-C can have a distance from the frame 20 that is different than the distance of one of the other HMD connectors 90A-C. One of the HMD connectors 90A-C can be at or near a first end of the arm 40, and another one of the HMD connectors 90A-C can be at or near a second end of the arm 40. One or more of the HMD connectors 90A-C can be disposed at the temple component 36, and one or more of the HMD connectors 90A-C can be disposed at the earpiece 38.

By distributing the HMD connectors 90A-C at different locations, the user can have the option to select any one of the HMD connectors 90A-C for connection with the accessory device 100. The user can further have the option to change the connection from one of the HMD connectors 90A-C to another one of the HMD connectors 90A-C. The selection among the HMD connectors 90A-C can alter the effect that the accessory device 100 has on the head-mountable device 10 and/or the user. For example, by extending from a different region of the arm, the accessory device 100 can provide different magnitude and direction of forces while or after the head-mountable device 10 is worn by the user. The selection among the HMD connectors 90A-C can be made to evenly distribute forces on the head of the user and/or provide greater comfort with the customization offered to the user.

Figure 5:
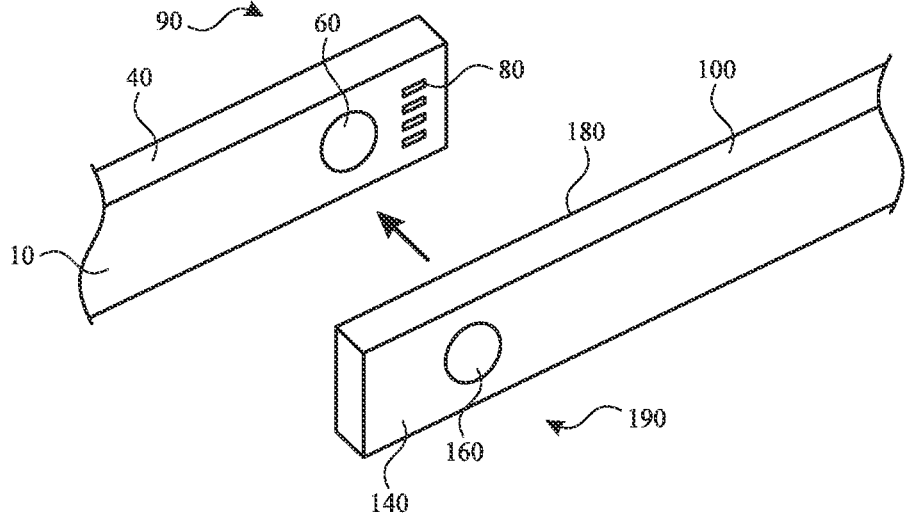
FIG. 5 illustrates an enlarged perspective view of a head-mountable device for connection with an accessory device, in accordance with embodiments of the present disclosure.

Referring now to FIG. 5, an HMD connector 90 of the head-mountable device 10 can be configured to mechanically and/or operably (e.g., communicatively) connect to an accessory connector 190 of an accessory device 100. While the arrangement illustrated in FIG. 5 indicates an HMD connector 90 and an accessory connector 190, it will be understood that the features of each can be switched to provide the effects described herein. It will be further understood that such an arrangement can further apply to the arrangement of an accessory connector of an accessory device with an external connector of an external device.

An accessory device 100 and a head-mountable device 10 can be connected in a manner that secures the relative positions of the accessory connector 190 and the HMD connector 90 with respect to each other. The HMD connector 90 can include an HMD positioning element 60, and the accessory connector 190 can include an accessory positioning element 160, wherein the positioning elements are configured to limit movement of the end portion 140 of the accessory device 100 away from the surface of the arm 40. For example, the HMD positioning element 60 and the accessory positioning element 160 can include magnets that magnetically couple to each other with an attractive force for securement of the accessory device 100 to the head-mountable device 10. Accordingly, the HMD positioning element 60 and the accessory positioning element 160 can resist forces that pull the end portion 140 directly away from the surface of the arm 40. However, the positioning element 160 can provide less ability to limit movement of the end portion 140 of the accessory device 100 across the surface of the arm 40 (e.g., by shear forces). As such, the user may, with some ease, slide the accessory connector 190 across the HMD connector 90 to decouple them.

The accessory device 100 and the head-mountable device 10 can be connected in a manner that provides a communication link there between. For example, the head-mountable device 10 can be provided with a HMD communication interface 80, and the accessory device 100 can be provide with an accessory communication interface 180. The HMD communication interface 80 and the accessory communication interface 180 can include conductive contacts that are configured to make electrical contact when the HMD connector 90 and the accessory connector 190 are engaged with each other. For example, one or more of the HMD communication interface 80 and the accessory communication interface 180 can include a moveable element for making an electrical connection, such as a pogo pin that is at least partially collapsible and/or a contact pad that is at least partially flexible. By further example, a pogo pin can be spring loaded and/or a contact pad can be formed from an electrically conductive foam or elastomer.

It will be understood that a variety of other communication links can be provided between the HMD communication interface 80 and the accessory communication interface 180. No direct contact may be required to establish a communication link. For example, a communication link between the HMD communication interface 80 and the arm communication interface can include wireless interfaces, Bluetooth interfaces, Near Field Communication interfaces, magnetic interfaces, inductive interfaces, resonant interfaces, capacitive coupling interfaces, Wi-Fi interfaces, optical interfaces, acoustic interfaces, and/or other communication interfaces.

The HMD communication interface 80 and the accessory communication interface 180 can facilitate communication (e.g., transfer) of power, data, or other signals between components of the accessory device 100 and the head-mountable device 10. For example, the link between the HMD communication interface 80 and the accessory communication interface 180 can facilitate communication between an HMD component (e.g., processor) of the head-mountable device 10 and an accessory component of the accessory device 100. The communication link can allow the accessory component of the accessory device 100 to provide its functionality to an HMD component of the head-mountable device 10, as discussed herein.

The secured positions and the communication link can both be achieved and maintained upon connection of the accessory connector 190 and the HMD connector 90. The secured positions and the communication link can both be removed upon disconnection of the accessory connector 190 from the HMD connector 90.

Figure 6:
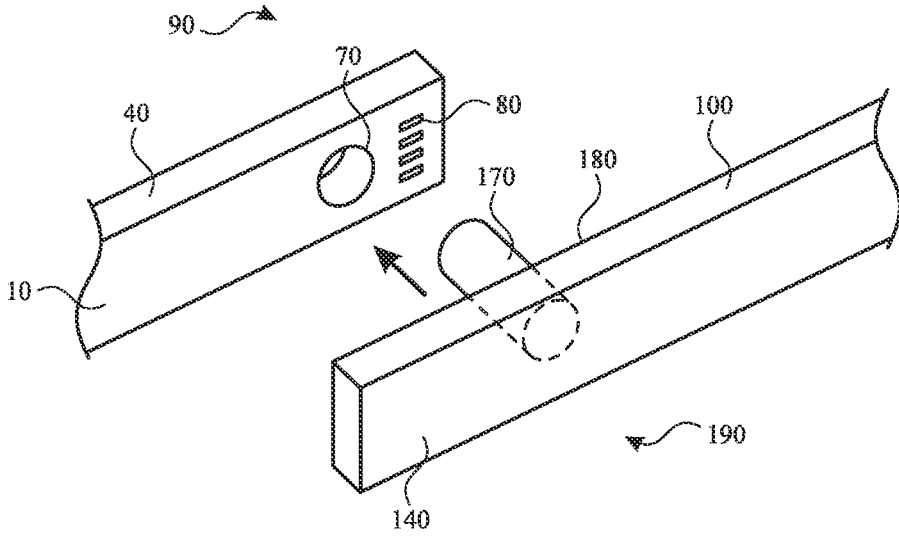
FIG. 6 illustrates an enlarged perspective view of a head-mountable device for connection with an accessory device, in accordance with embodiments of the present disclosure.

Referring now to FIG. 6, an HMD connector 90 of the head-mountable device 10 can be configured to mechanically and/or operably (e.g., communicatively) connect to an accessory connector 190 of an accessory device 100. While the arrangement illustrated in FIG. 6 indicates an HMD connector 90 and an accessory connector 190, it will be understood that the features of each can be switched to provide the effects described herein. It will be further understood that such an arrangement can further apply to the arrangement of an accessory connector of an accessory device with an external connector of an external device.

An accessory device 100 and a head-mountable device 10 can be connected in a manner that secures the relative positions of the accessory connector 190 and the HMD connector 90 with respect to each other. The HMD connector 90 can include an HMD shear lock element 70, and the accessory connector 190 can include an accessory shear lock element 170, wherein the shear lock elements are configured to limit movement of the end portion 140 of the accessory device 100 across the surface of the arm 40. For example, the HMD shear lock element 70 and the accessory shear lock element 170 can include a post and opening with complementary shapes that engage each other to limit movement in at least one direction. Accordingly, the HMD shear lock element 70 and the accessory shear lock element 170 can resist forces (e.g., shear forces) that drag the end portion 140 across the surface of the arm 40. However, the accessory shear lock element 170 can provide less ability to limit movement of the end portion 140 of the accessory device 100 directly away from the surface of the arm 40. As such, the user may, with some ease, slide the accessory connector 190 away from the HMD connector 90 to decouple them. However, other features can prevent inadvertent release of the HMD positioning element 60 from the accessory positioning element 160, such as a detent (e.g., ball detent), latch, or other mechanism that requires a threshold amount of force to decouple the HMD positioning element 60 from the accessory positioning element 160. Such mechanisms can be provided as positioning elements, as described further herein.

While the HMD shear lock element 70 and the accessory shear lock element 170 are shown with a connection that occurs with movement transverse to the longitudinal lengths thereof, it will be understood that other arrangements can provide. For example, the accessory shear lock element 170 can be inserted into the HMD shear lock element 70 in a direction that is approximately parallel to a longitudinal length of the arm 40 and/or the end portion 140. Such insertion can be in a direction that is towards a frame of the head-mountable device, such that the user can insert in a direction while providing a counterforce on the front of the frame, for example. Alternatively, insertion can be in a direction that is away from the frame of the head-mountable device, such that the user can insert in a direction with the user's face providing a counter-force in an opposite direction. Additionally or alternatively, an accessory shear lock element 170 can extend about at least a portion of a periphery of the arm 40. For example, such an accessory shear lock element 170 can clip onto the arm 40 to provide secure engagement and a communication link. The arm 40 can provide a groove for receiving the clipping action and/or guide sliding of the accessory shear lock element 170 onto and off of the arm 40.

The accessory device 100 and the head-mountable device 10 can be connected in a manner that provides a communication link there between, for example with an HMD communication interface 80 and an accessory communication interface 180 as described herein. The HMD communication interface 80 and the accessory communication interface 180 can optionally be integrated with the HMD positioning element 60 and the accessory positioning element 160, respectively, such that the communication link is establish with mechanical coupling of the HMD positioning element 60 and the accessory positioning element 160. The secured positions and the communication link can both be achieved and maintained upon connection of the accessory connector 190 and the HMD connector 90. The secured positions and the communication link can both be removed upon disconnection of the accessory connector 190 from the HMD connector 90.

Figure 7:
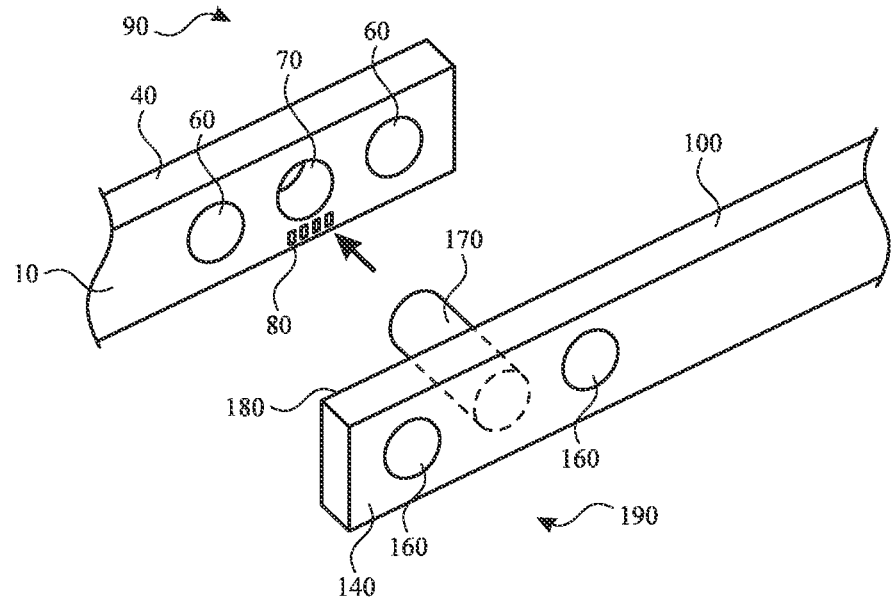
FIG. 7 illustrates an enlarged perspective view of a head-mountable device for connection with an accessory device, in accordance with embodiments of the present disclosure.

Referring now to FIG. 7, an HMD connector 90 of the head-mountable device 10 can be configured to mechanically and/or operably (e.g., communicatively) connect to an accessory connector 190 of an accessory device 100. While the arrangement illustrated in FIG. 7 indicates an HMD connector 90 and an accessory connector 190, it will be understood that the features of each can be switched to provide the effects described herein. It will be further understood that such an arrangement can further apply to the arrangement of an accessory connector of an accessory device with an external connector of an external device.

An accessory device 100 and a head-mountable device 10 can be connected in a manner that secures the relative positions of the accessory connector 190 and the HMD connector 90 with respect to each other by combining both positioning elements and shear lock elements. The HMD connector 90 can include an HMD positioning element 60 and an HMD shear lock element 70, and the accessory connector 190 can include an accessory positioning element 160 and an accessory shear lock element 170, each as described herein. The combination of shear lock elements and positioning elements limits relative movement both away from and across the surfaces of the HMD connector 90 and the accessory connector 190. For example, the shear lock elements can resist relative lateral movement until a coupling force (e.g., magnetic coupling force) from the positioning elements is overcome. The accessory device 100 and the head-mountable device 10 can be connected in a manner that also provides a communication link there between, for example with an HMD communication interface 80 and an accessory communication interface 180 as described herein.

Figure 8:
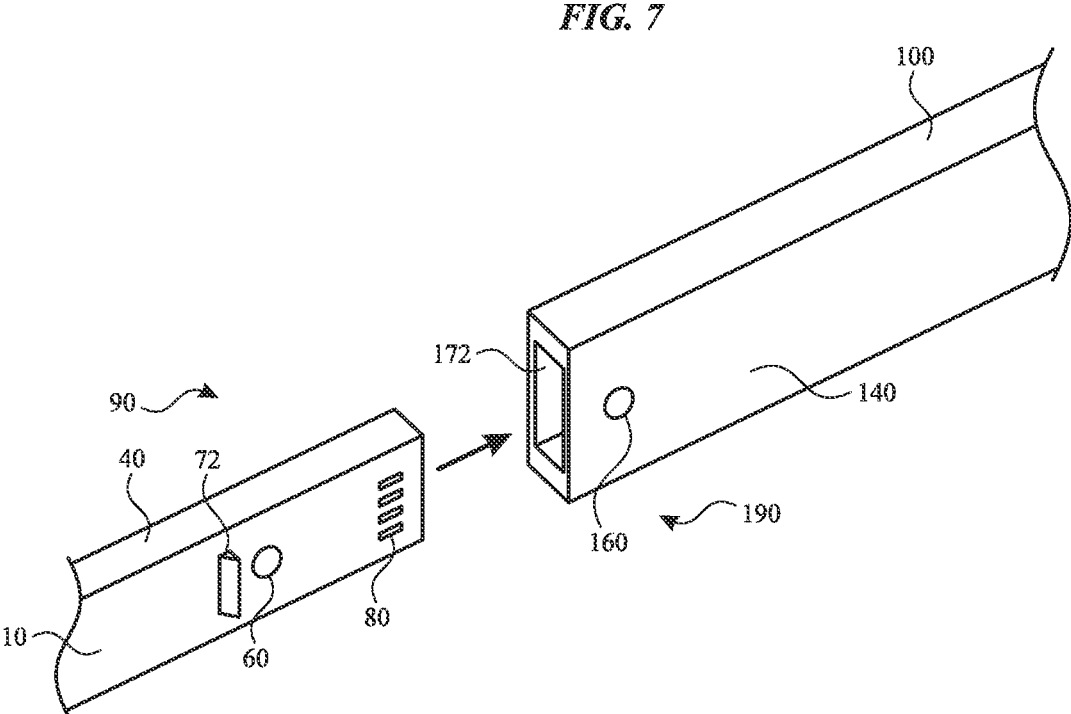
FIG. 8 illustrates an enlarged perspective view of a head-mountable device for connection with an accessory device, in accordance with embodiments of the present disclosure.

Referring now to FIG. 8, an HMD connector 90 of the head-mountable device 10 can be configured to mechanically and/or operably (e.g., communicatively) connect to an accessory connector 190 of an accessory device 100. While the arrangement illustrated in FIG. 8 indicates an HMD connector 90 and an accessory connector 190, it will be understood that the features of each can be switched to provide the effects described herein. It will be further understood that such an arrangement can further apply to the arrangement of an accessory connector of an accessory device with an external connector of an external device.

Additionally or alternatively, the HMD connector 90 and the accessory connector 190 can mechanically engage each other in other ways for securement of the accessory device 100 to the head-mountable device 10. The HMD connector 90 and the accessory connector 190 can have complementary shapes to facilitate engagement. For example, the HMD connector 90 can form a protrusion and the accessory connector 190 can form a groove, opening, and/or channel 172. The groove, opening, and/or channel 172 can have a shape and/or size that complement the shape and/or size of the HMD connector 90 (e.g., the arm 40). It will be understood that a variety of shapes and/or sizes can be provided to achieve the engagement between the HMD connector 90 and the accessory connector 190. One or more features, such as a stopper 72 can limit movement of the HMD connector 90 within the groove, opening, and/or channel 172. The HMD connector 90 can also include an HMD positioning element 60, and the accessory connector 190 can include an accessory positioning element 160, each as described herein, to resist movement out of the groove, opening, and/or channel 172 until a shear lock force is overcome. The accessory device 100 and the head-mountable device 10 can be connected in a manner that also provides a communication link there between, for example with an HMD communication interface 80 and an accessory communication interface 180 as described herein.

Referring now to FIG. 9, an HMD connector 90 of the head-mountable device 10 can be configured to mechanically and/or operably (e.g., communicatively) connect to an accessory connector 190 of an accessory device 100. While the arrangement illustrated in FIG. 9 indicates an HMD connector 90 and an accessory connector 190, it will be understood that the features of each can be switched to provide the effects described herein. It will be further understood that such an arrangement can further apply to the arrangement of an accessory connector of an accessory device with an external connector of an external device.

Additionally or alternatively, the HMD connector 90 and the accessory connector 190 can mechanically engage each other in other ways for securement of the accessory device 100 to the head-mountable device 10. The HMD connector 90 and the accessory connector 190 can have complementary shapes to facilitate engagement. For example, the accessory connector 190 can form a protrusion and the HMD connector 90 can form a groove, opening, and/or channel 78. The groove, opening, and/or channel 78 can have a shape and/or size that complement the shape and/or size of the HMD connector 90 (e.g., the end portion 140). The accessory device 100 and the head-mountable device 10 can be connected in a manner that also provides a communication link there between, for example with an HMD communication interface 80 and an accessory communication interface 180 as described herein.

Additionally or alternatively with respect to any of the shear lock elements and/or positioning elements described herein, the accessory connector 190 can be pressed, snap fit or otherwise inserted into the HMD connector 90. Once coupled, the accessory connector 190 can be locked or otherwise secured within the HMD connector 90. Additional or alternative mechanisms can be provided to lock the accessory device 100 in place with respect to the head-mountable device 10. For example, mechanisms such as locks, latches, snaps, screws, clasps, threads, magnets, pins, an interference (e.g., friction) fit, knurl presses, bayoneting, and/or combinations thereof can be included to lock the accessory device 100 to the head-mountable device 10 when the HMD connector 90 and the accessory connector 190 engage each other.

The accessory device 100 can optionally remain locked from moving with respect to the head-mountable device 10 until a release mechanism is actuated. The release mechanism can be provided on an outer surface of the head-mountable device 10 for access by a user. For example, the release mechanism can be provided on an outer surface of the head-mountable device 10 and/or the accessory device 100. Where a locking mechanism locks the accessory device 100 in place with respect to the head-mountable device 10, the release mechanism, when actuated, can move and act upon the locking mechanism to cause it to release. For example, the release mechanism, when actuated, can release one or more locks, latches, snaps, screws, clasps, threads, magnets, pins, an interference (e.g., friction) fit, knurl presses, bayoneting, and/or combinations thereof that were previously locking the accessory device 100 to the head-mountable device 10. At least some of the interactions between the release mechanism and a locking mechanism can be within the head-mountable device 10 and/or the accessory device 100.

Figure 12:
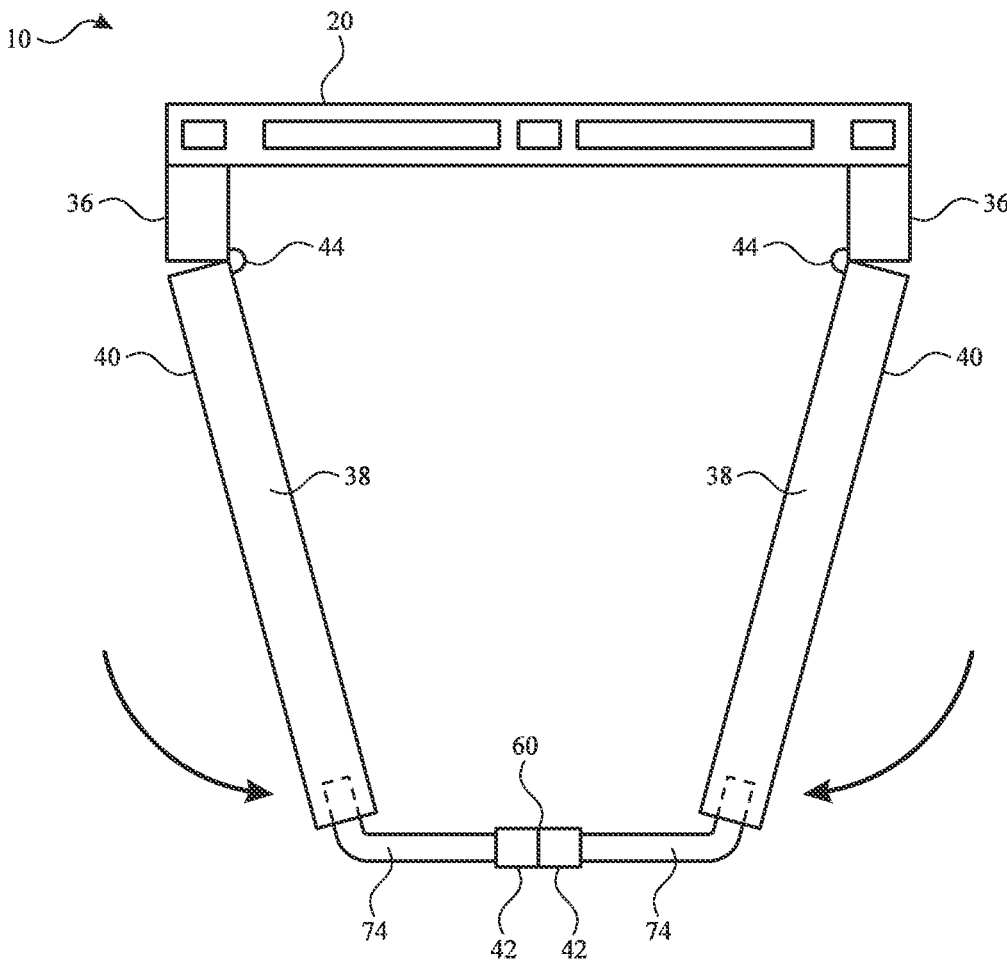
FIG. 12 illustrates a top view of a head-mountable device with connectors engaging each other, in accordance with embodiments of the present disclosure.

Referring now to FIGS. 10-12, the arm 40 of the head-mountable device 10 can include or be coupled to an end portion 42 thereof. As shown in FIG. 10, the end portion 42 can include or form an HMD positioning element 60, an HMD shear lock element, and/or an HMD communication interface 80. Such elements can include the features described herein. With respect to a connector of a head-mountable device and/or an accessory device.

While the end portion 42 is shown as an extension beyond the arm 40 in FIG. 10, it will be understood that the end portion 42 can be partially or entirely stored within the arm 40 in a retracted configuration. From such a configuration, the end portion 42 can be ejected, pulled, and/or released by direction interaction from a user and/or operation of a button 76.

As shown in FIG. 11, the end portion 42 can extend from the arm 40 to make a connection to another portion and/or device. For example, the end portion 42 can be connected to the arm 40 by a tether 74, which can provide mechanical and/or operable (e.g., communicative) connection to the arm 40 and/or any components of the head-mountable device 10. In the retracted configuration of FIG. 10, when the end portion 42 abuts the arm 40, a portion of the tether 74 can be retracted within the arm 40. In an extended configuration, as shown in FIG. 11, the tether 74 can extend out of and away from the arm 40 to allow the end portion 42 to move to another location. The tether 74 and the end portion 42 can be biased (e.g., by a coil, spring, tension bias, etc.) to retract back to the arm 40. Additionally or alternatively, the tether 74 and the end portion 42 can be retracted upon operation of the button 76, which can activate a retraction and/or biasing mechanisms to return the tether 74 and the end portion 42 to the retracted configuration.

The end portion 42 can mechanically and operably (e.g., communicatively) connect to an accessory device, an external device, and/or another end portion 42. For example, as shown in FIG. 12, opposing end portions 42 extending from separate arms 40 can be mechanically and/or operably (e.g., communicatively) connection to each other. The lengths of the tethers 74 can facilitate such a connection while maintaining an anchor to the corresponding arms 40. Such a connection can provide an operable (e.g., communicative) connection between the arms 40 and/or components thereof.

As further shown in FIG. 12, the connection of the end portions 42 can bias the arms 40 towards each other. For example, the earpieces 38 can pivot about the hinges 44 and relative to the temple components 36 to extend towards each other. Such action can be facilitated by the connection between the end portions 42 and a bias applied to the tethers 74. The bias of the arms 40 can help retain the head-mountable device 10 on a head of the user while worn. Additionally or alternatively, the bias of the arms 40 can maintain the head-mountable device 10 in a collapsed configuration that can be more compact for storage.

Figure 13:
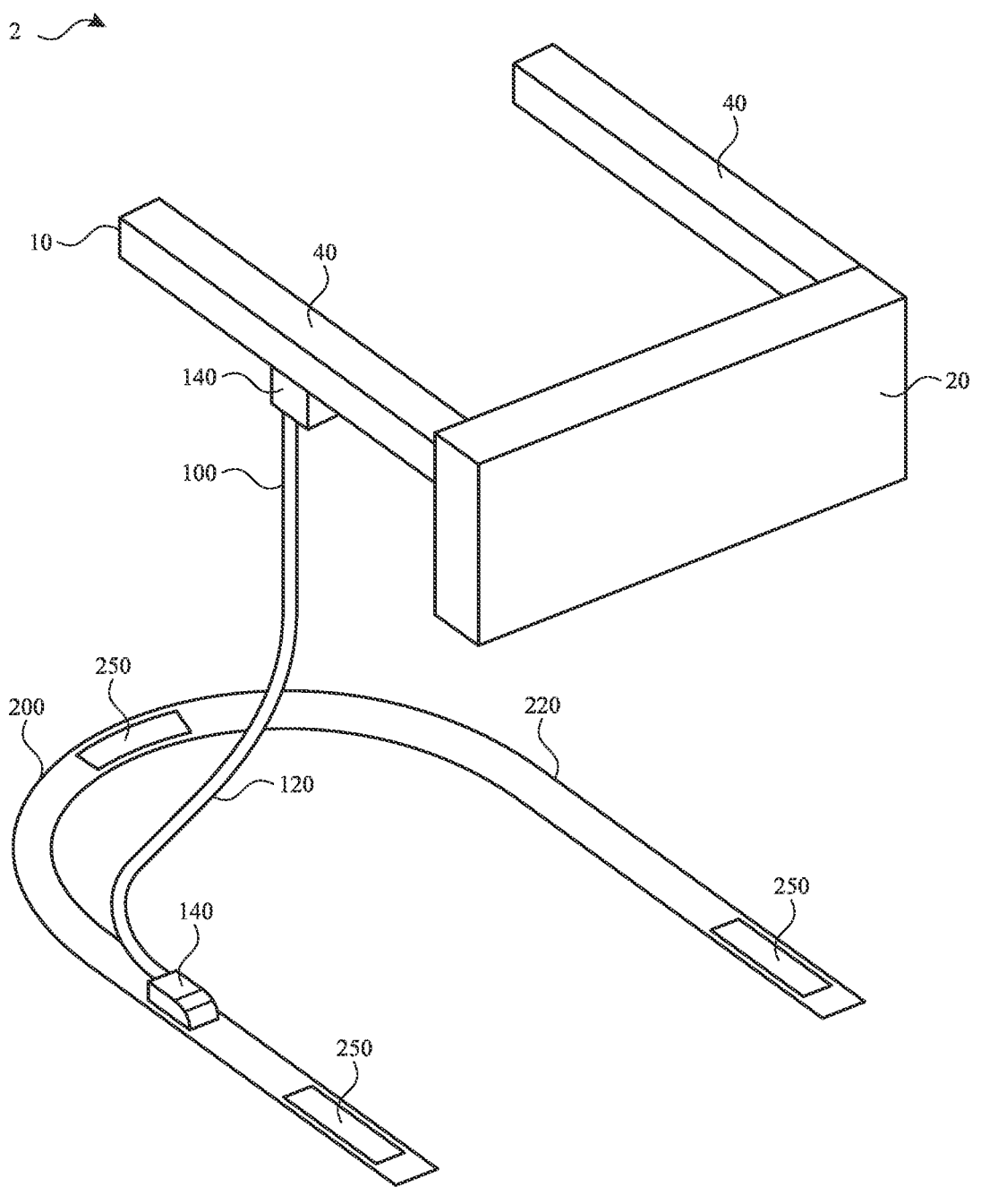
FIG. 13 illustrates a perspective view of a head-mountable device connected by an accessory device to an external device, in accordance with embodiments of the present disclosure.

Referring now to FIG. 13, components of the head-mountable device 10 can be in operative communication with components of an external device 200 via the accessory device 100. As shown in FIG. 13, the accessory device 100 can provide a first end portion 140 that is connected to the head-mountable device 10 (e.g., at an arm 40) and a second end portion 140 that is connected to an external device 200. The external device 200 can be a wearable device that is worn optionally near the head-mountable device 10. In FIG. 13, the external device 200 is provided with the form of a curved component that can be wrapped around a portion of the user's neck. It will be understood that other shapes can be provided to attach the external device 300 to the user and/or an object worn by the user (e.g., clothing, etc.). The external device 200 can be worn on a head, neck, ear, shoulders, and/or other portion of the user. The external device 200 can include one or more external components 250 that provide functions to the head-mountable device 10 and/or the accessory device 100 when connected thereto, as described herein.

Figure 14:
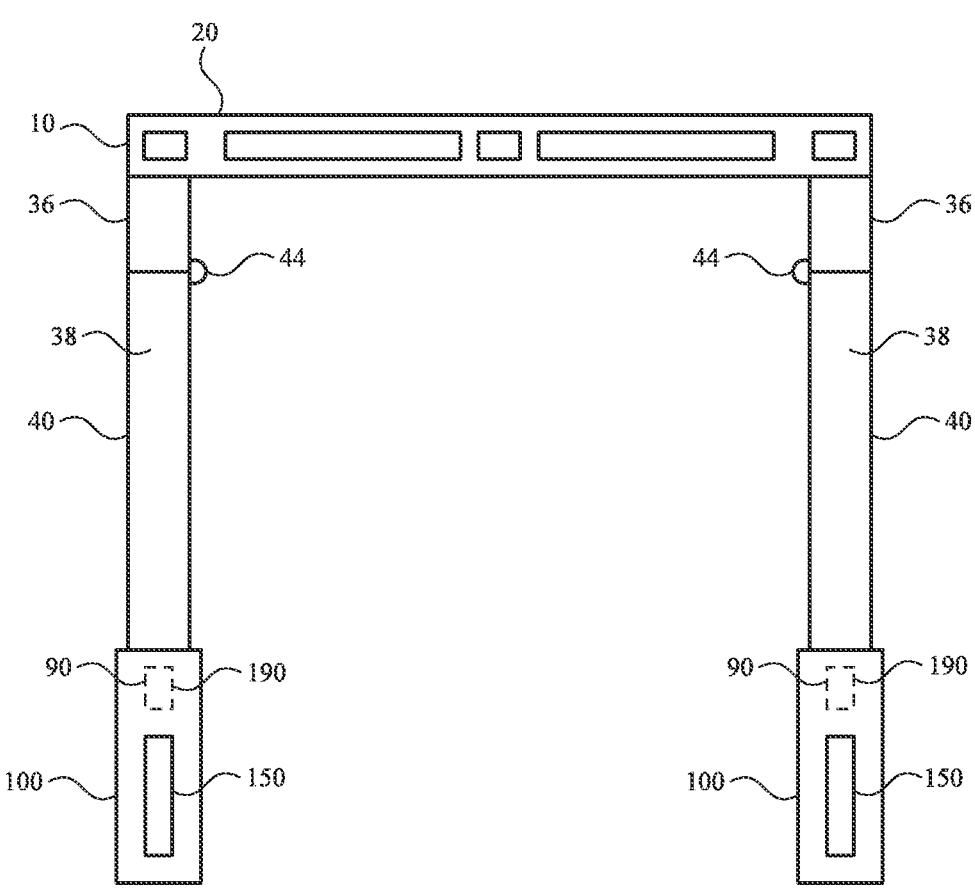
FIG. 14 illustrates a top view of a head-mountable device with accessory devices connected to the head-mountable device, in accordance with embodiments of the present disclosure.

Referring now to FIG. 14, multiple accessory device can be provided, and the accessory devices can have independent connections to the head-mountable device. Multiple accessory devices 100 can be positioned at a location that enhances the comfort of the combined system 2 to the user when worn. For example, the accessory devices 100 can be positioned at a portion of the arm 40 and/or the frame 20 to provide a counter-balance to the weight of certain components of the head-mountable device 10. One or more electronic components and/or non-electronic components of the accessory device 100 can provide the desired weight so that the weight of the combined system 2 is distributed to enhance the comfort of the user. Each of the accessory devices 100 can be connected by an accessory connector 190 to a corresponding HMD connector 90.

Figure 15:
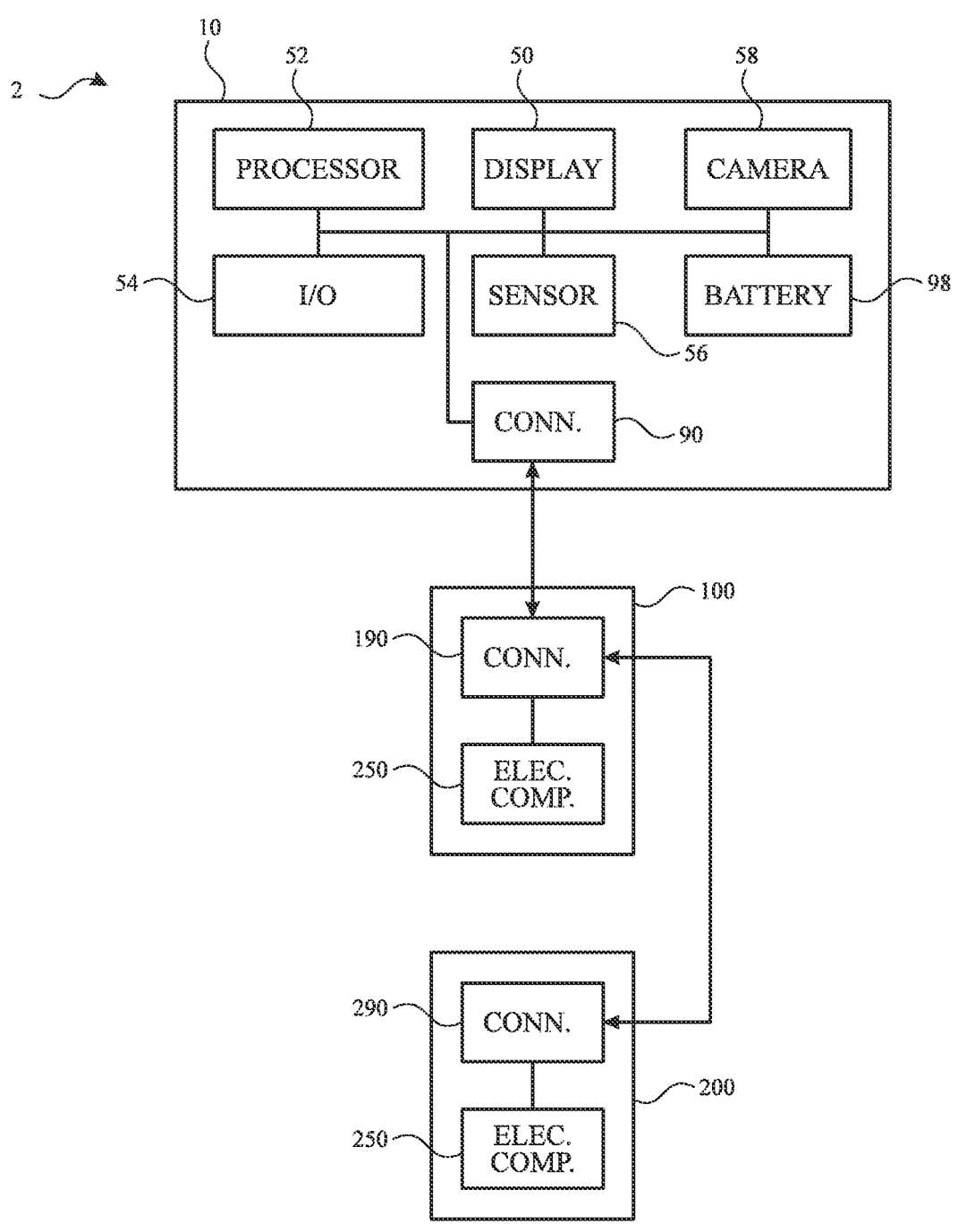
FIG. 15 illustrates a block diagram of a head-mountable device, in accordance with some embodiments of the present disclosure.

FIG. 15 illustrates a block diagram of a system including a head-mountable device and one or more accessory devices and/or external devices, in accordance with some embodiments of the present disclosure. It will be appreciated that components described herein can be provided on either or both of a head-mountable device, an accessory device, and/or an external device. In some embodiments, components are provided by an accessory device and/or an external device instead of a head-mountable device to reduce redundancy and increase customization based on a selection of accessory devices.

It will be understood that any one or more of the components of the head-mountable device 10 described herein can correspond to an HMD component of FIGS. 1-14. As such, the accessory component 150 of the accessory device 100 and/or the external component 250 of the external device 200 can interact with any one or more of the components of the head-mountable device 10 illustrated in FIG. 15.

As shown in FIG. 15, the head-mountable device 10 can include a processor 52 with one or more processing units that include or are configured to access a memory having instructions stored thereon. The instructions or computer programs may be configured to perform one or more of the operations or functions described with respect to the head-mountable device 10. The processor 52 can be implemented as any electronic device capable of processing, receiving, or transmitting data or instructions. For example, the processor 52 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The memory can store electronic data that can be used by the head-mountable device 10. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

The head-mountable device 10 can include a camera 58 for capturing a view of an environment external to the head-mountable device 10. The camera 58 can include an optical sensor, such as a photodiode or a photodiode array. Additionally or alternatively, the camera 58 can include one or more of various types of optical sensors that are arranged in various configurations for detecting user inputs described herein. The camera 58 may be configured to capture an image of a scene or subject located within a field-of-view of the camera 58. The image may be stored in a digital file in accordance with any one of a number of digital formats. In some embodiments, the head-mountable device 10 includes a camera, which includes an image sensor formed from a charge-coupled device (CCD) and/or a complementary metal-oxide-semiconductor (CMOS) device, a photovoltaic cell, a photo resistive component, a laser scanner, and the like. It will be recognized that a camera can include other motion sensing devices.

The head-mountable device 10 can further include an optical module 50 for displaying visual information for a user. The optical module 50 can provide visual (e.g., image or video) output. The optical module 50 can be or include an opaque, transparent, and/or translucent display. A transparent or translucent optical module 50 may have a medium through which light representative of images is directed to a user's eyes. The optical module 50 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The head-mountable device 10 can include an input/ output component 54, which can include any suitable component for connecting head-mountable device 10 to other devices. Suitable components can include, for example, audio/video jacks, data connectors, or any additional or alternative input/output components. The input/output component can include buttons, keys, or another feature that can act as a keyboard for operation by the user. As such, the description herein relating to keyboards can apply to keyboards, keys, and/or other input features integrated on the head-mountable device 10. Such an input/output component can be fixedly or removably attached to a display unit of the head-mountable device 10.

The head-mountable device 10 can include communications interface with a HMD connector 90 for communicating with one or more servers or other devices using any suitable communications protocol. For example, communications interface can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. A communications interface can also include an antenna for transmitting and receiving electromagnetic signals.

The head-mountable device 10 can include the HMD communication interface of an HMD connector 90 for communicating with the accessory device 100 via the accessory connector 190 and/or the external device 200 via the accessory device 100. The head-mountable device 10 can provide one or more HMD connectors 90 for communicating with a corresponding number of accessory devices 100. Additionally or alternatively, a number of accessory devices 100 can communicate with the head-mountable device 10 via a smaller or greater number of HMD connectors 90.

The head-mountable device 10 can one or more sensors 56 may also include various sensors that detect conditions pertaining to the user, the head-mountable device 10, and/or the head-securement element. For example, in addition to the camera 58, the head-mountable device 10 may include motion sensors, such as one or more of accelerometers, gyroscopes, magnetometers, inertial measurement units (IMU), cameras, or the like, which measure conditions pertaining to the position and/or orientation of the head of the user and/or the head-mountable device 10.

The sensor 56 can include one or more eye sensors for tracking features of the user wearing the head-mountable device 10, including conditions of the user's eye (e.g., focal distance, pupil size, etc.). For example, such sensors can perform facial feature detection, facial movement detection, facial recognition, eye tracking, user mood detection, user emotion detection, voice detection, etc. For example, an eye sensor can optically capture a view of an eye (e.g., pupil) and determine a direction of a gaze of the user.

The head-mountable device 10 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc.

The head-mountable device 10 can include a battery 98, which can charge and/or power components of the head-mountable device 10. The battery 98 can also charge and/or power components connected to the head-mountable device 10.

As further shown in FIG. 15, one or more accessory devices 100 and/or external device 200 can include components to perform selected functions and to interact with the head-mountable device 10. While the accessory device 100 and/or external device 200 of FIG. 15 are illustrated as being substantially similar, it will be understood that accessory devices 100 and/or external devices 200 can be provided simultaneously with different features.

Each accessory device 100 and/or external device 200 can be controlled at least in part by the processor 52 of the head-mountable device 10. For example, while the accessory device 100 and/or external device 200 is connected to the head-mountable device 10, the processor 52 of the head-mountable device 10 can operably connect to and/or control one or more components of the accessory device 100 and/or external device 200 via the communication link provided by the HMD communication interface 80 and the accessory communication interface 180.

Additionally or alternatively, the head-mountable device 10 can be controlled at least in part by the accessory component 150 of the accessory device 100 and/or external device 200. For example, while the accessory device 100 and/or external device 200 is connected to the head-mountable device 10, the accessory component 150 of an accessory device 100 and/or an external device 200 can operably connect to and/or control one or more components of the head-mountable device 10 via the communication link provided by the HMD communication interface 80 and the accessory communication interface 180.

In some embodiments, the accessory device 100 and/or the external device 200 can operate as a power source for the head-mountable device 10. By providing power with a removable accessory device, the user can select such an accessory device according to anticipated power needs. The accessory component 150 can include a battery that is used to store and provide power to the head-mountable device 10 and/or the accessory device 100. Optionally, the accessory device 100 and/or the external device 200 can recharge the battery 98 of the head-mountable device 10, for example, by directing power from the accessory component 150 (e.g., battery) across the HMD connector 90. Other pathways are contemplated, such as another link or wireless charging. The battery can be a replaceable battery, a rechargeable battery. Additionally or alternatively, the accessory component 150 can be a tethered power source that receives power from a source external to the accessory device 100, such as from a USB cable, Lightening cable, or other interface. One or more batteries of the head-mountable device can transfer power to and/or receive power from another device. Such power transfer can be wired and/or wireless.

Further examples of accessory components 150 and/or external components 250 include speakers. Such speakers can be operated in concert with or independently of the speakers of the head-mountable device 10. Speakers of the accessory device 100 and/or the external device 200 can be provided and operated at locations that enhance the audio output of the combined system 2. For example, the speakers of the accessory device 100 and/or the external device 200 can be operated to provide spatial audio to the user.

Further examples of accessory components 150 and/or external components 250 include cameras. Such cameras can be operated in concert with or independently of the cameras 130 of the head-mountable device 10. Cameras of the accessory device 100 and/or the external device 200 can be provided and operated at locations that enhance the visual capture capabilities of the combined system 2. For example, the cameras of the accessory device 100 and/or the external device 200 (optionally with the cameras 58 of the head-mountable device 10) can be operated in concert to capture a combined image that spans a wide field of view. For example, the field of view can be greater than 90°, 180°, 270°, or up to 360°. Images captured by one or more of the cameras of the accessory device 100 and/or the external device 200 can be displayed on the optical module 50 of the head-mountable device 10.

Further examples of accessory components 150 and/or external components 250 include microphones. Such microphones can be operated in concert with or independently of microphones of the head-mountable device 10. Microphones of the accessory device 100 and/or the external device 200 can be provided and operated at locations that enhance the audio capture capabilities of the combined system 2. For example, the microphones of the accessory device 100 and/or the external device 200 can be operated to capture directional audio from an environment of the user.

Further examples of accessory components 150 and/or external components 250 include sensors. By providing sensing capabilities with a removable module, the user can select such an accessory device 100 and/or an external device 200 when sensing particular conditions is desired. Such sensors can be configured to sense substantially any type of characteristic such as, but not limited to, images, pressure, light, touch, force, temperature, position, motion, and so on. For example, the sensor may be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. The sensor can be used to sense ambient conditions in a neighboring environment. The sensor can be provided with exposure to the environment, for example with an opening in the accessory device 100 and/or the external device 200.

Further examples of accessory components 150 and/or external components 250 include bio-sensors. By providing bio-sensing capabilities with a removable module, the user can select such an accessory device 100 and/or an external device 200 when tracking biometric characteristics, such as health and activity metrics, is desired. The one or more bio-sensors can include optical and/or electronic biometric sensors that may be used to compute one or more biometric characteristics. For example, a bio-sensor can include a light source and a photodetector to form a photoplethysmography (PPG) sensor. An optical (e.g., PPG) sensor or sensors may be used to compute various biometric characteristic including, without limitation, a heart rate, a respiration rate, blood oxygenation level, a blood volume estimate, blood pressure, or a combination thereof. One or more of the bio-sensors may also be configured to perform an electrical measurement using one or more electrodes. The electrical sensor(s) may be used to measure electrocardiogramaracteristics, galvanic skin resistance, and other electrical properties of the user's body. Additionally or alternatively, a bio-sensor can be configured to measure body temperature, exposure to UV radiation, and other health-related information.

Further examples of accessory components 150 and/or external components 250 include user sensors. Such sensors can be used to detect features relating to the user wearing the head-mountable device and/or other individuals. For example, user sensors can perform facial feature detection, facial movement detection, facial recognition, eye tracking, user mood detection, user emotion detection, voice detection, etc.

Further examples of accessory components 150 and/or external components 250 include components for receiving input from a user, providing output to a user, and/or performing other functions. Examples of such components include a speaker, a microphone, a display, a touch sensor, a haptic device, a camera, an optical sensor, a magnet, a gyroscope, an accelerometer, and/or another I/O component. The I/O components can be used to detect and interpret user inputs. The I/O components can be used to provide information to the user. The I/O components can also be used to capture information relating to the user and/or the environment.

Examples of accessory components 150 and/or external components 250 include display drivers. By providing display drivers with a removable module, the user can select such an accessory device 100 and/or external device 200 when certain display features are desired. Such display drivers can be configured to control the optical module 50 of the head-mountable device 10.

Each accessory device 100 and/or external device 200 can further include any number of accessory components 150 and/or external components 250. By providing electronic components on a removable accessory device and/or external device, the user can optionally provide an appropriate accessory device and/or external device when selected functions are desired. At other times, other accessory devices and/or external devices or no accessory device and/or external device can be selected, thereby reducing the need to have all features available at all times in the head-mountable device 10.

The head-mountable device 10 can provide an output to a user based on an action relating to the accessory device 100 and/or the external device 200. For example, the head-mountable device 10 can provide an output upon attachment and/or removal of the accessory device 100 and/or the external device 200 with respect to the head-mountable device 10. By further example, the head-mountable device 10 can provide an output upon detection of a user input provided at the accessory device 100 and/or the external device 200. The output provided by the head-mountable device 10 can include a confirmation relating to an operation and/or condition (e.g., installed, absent, active, inactive, charged, etc.) of the accessory device 100 and/or the external device 200. The output provided by the head-mountable device 10 can include a prompt relating to an action for the user to perform. The output can be provided according to the operation of the processor 52 of the head-mountable device 10 and produce by one or more components of the head-mountable device 10 that is operably connected to the processor 52. For example, the output can be a visual output produced by the optical module 50, an audio output produced by the speaker, a haptic output produced by a haptic device, or another output that is detectable by the user and produced by another component of the head-mountable device.

Additionally or alternatively, the head-mountable device 10 can alter one or more parameters of its operations based on the presence, absence, or other condition of the accessory device 100 and/or the external device 200. For example, when the accessory device 100 and/or the external device 200 is installed, the head-mountable device 10 may perform an action the utilized the functions of the accessory device 100 and/or the external device 200. By further example, when the accessory device 100 and/or the external device 200 is absent, the head-mountable device 10 may perform an action that does not rely on the functions of the accessory device 100 and/or the external device 200. Additionally or alternatively, the head-mountable device 10 may perform actions in a manner that consumes power based on the presence, absence, and/or amount of power provided by an accessory device 100 and/or an external device 200. For example, the head-mountable device 10 can perform an action with greater power consumption (e.g., high-resolution display output, enhanced audio and/or imaging processing, communication with external devices) when a battery of the accessory device 100 and/or the external device 200 is present and sufficiently charged, and the head-mountable device 10 can perform an action with lower power consumption (e.g., low-resolution display output, reduced audio and/or imaging processing, reduced communication with external devices) or refrain from performing such an action when a battery of the accessory device 100 and/or the external device 200 is absent or not sufficiently charged.

The accessory device 100 and/or the external device 200 can be configured to interact with at least one other device other than the head-mountable device 10. For example, the accessory device 100 and/or the external device 200 can be charged by an external device with a power source, so that the battery of the accessory device 100 and/or the external device 200 carries a charge for transfer to the head-mountable device 10. Communication between an external device and the accessory device 100 and/or the external device 200 can optionally be conducted via the connector(s) of the accessory device 100 and/or the external device 200. Such an external device can further be configured to interact independently with the head-mountable device 10, for example to charge the battery 98 of the head-mountable device 10. Communication between an external device and the head-mountable device 10 can optionally be conducted via the HMD connector 90 of the head-mountable device 10.

It will be understood that the components of either the head-mountable devices, accessory devices, and/or external devices discussed herein can be provided on one or more of the head-mountable devices, accessory devices, and/or external devices. Furthermore, selection of different accessory devices and/or external devices provides a customized experience for a user.

It will be recognized that the difference in functionality between accessory devices and/or external devices can refer to both the purpose of a component as well as the parameters of its operation. For example, while the components of different accessory devices and/or external devices can both be for a common purpose, the components can operate differently to achieve the purpose. For example, different components can be for sensing different conditions based on the operations desired by a user. Other variations, such as size, shape, and material selection can be provided so the user can select the accessory device and/or external device that is best suited for the user's comfort and/or performance of the component.

The different accessory devices and/or external devices can also differ in mechanical configuration such as material properties and/or structural features, which can help define shape, size, flexibility, rigidity, tactile feel, and/or aesthetic properties such as color, patterns, and/or materials to provide a different look and feel. Furthermore, each of the accessory devices and/or external devices may have a different enclosure having a different color, material, shape, accoutrements, patterns, etc. The enclosures can provide different aesthetic features, cosmetic features, and/or a look and feel than the other enclosures in the system.

While the components of different accessory devices and/or external devices can differ, the accessory devices and/or external devices can have the same or similar connectors, including communication interfaces, so that each of the multiple accessory devices and/or external devices can attach to and communicate with the same head-mountable device in the same or similar manner.

Accordingly, each accessory device and/or external device is configured to provide a different function and/or aesthetic feature than one or more other accessory devices and/or external devices in the system. As such, the user can select the accessory device and/or external device with the desired functionality and/or look and feel. This may be at the time of purchase, thus allowing differentiation from other purchasers, or it may be that all or some portion of the accessory devices and/or external devices come in a set such that the user can select the desired accessory devices and/or external devices for the right moment. In one example, one accessory device and/or external device may be configured for use outside the home, while another may be configured for use at home. Any combination of aesthetic and functional features may be provided to create a different head-mountable device. When combined with the different head-mountable devices, the system becomes highly customizable. The user can create a different head-mountable device by selecting one head-mountable device to go along with one set of accessory devices and/or external devices. If multiple systems are provided, any number of different head-mountable device configurations can be made.

Accordingly, embodiments of the present disclosure provide a head-mountable device that provides connection mechanisms that provide adjustable and exchangeable connections with other devices to enhance performance of the head-mountable device. Such connections can provide both mechanical engagement and operable communication between the connected devices. Accessory devices and/or external devices can be easily connected to provide different components and functions at different times as desired. Accordingly, a main portion of the head-mountable device need not include permanent components that provide every function that will later be desired by the user. Instead, the head-mountable device can have expanded and customizable capabilities by the use of one or more accessory devices.

Various examples of aspects of the disclosure are described below as clauses for convenience. These are provided as examples, and do not limit the subject technology.

Clause A: a system comprising: a head-mountable device comprising: a frame; a processor; an optical module within the frame; multiple arms extending from the frame; and multiple HMD connectors each disposed at a corresponding one of the arms; and an accessory device comprising: multiple end portions at opposing ends of the accessory device; and accessory connectors each disposed at a corresponding one of the end portions, wherein the accessory device is configured to be arranged in: a first configuration with each of the accessory connectors engaged to a corresponding one of the HMD connectors to provide operable communication between the arms of the head-mountable device; and a second configuration with a first one of the accessory connectors engaged to a first one of the HMD connectors and a second one of the accessory connectors engaged to an external connector of an external device to provide operable communication between the head-mountable device and the external device.

Clause B: a head-mountable device comprising: a frame; a pair of arms extending from the frame; a processor; multiple HMD connectors disposed along each of the arms, each of the HMD connectors of a given one of the arms being disposed at a distance away from the frame that is different than a distance away from the frame for any other one of the HMD connectors of the given one of the arms, each of the HMD connectors being configured to releasably engage with an accessory connector of an accessory device and operably connect the processor to the accessory device.

Clause C: a head-mountable device comprising: a frame; a pair of arms extending from the frame; an optical module within the frame; and multiple HMD connectors, each of the HMD connectors being disposed at a terminal end of a corresponding one of the arms, each of the HMD connectors being extendible from the corresponding one of the arms, the HMD connectors being configured to releasably engage each other.

One or more of the above clauses can include one or more of the features described below. It is noted that any of the following clauses may be combined in any combination with each other, and placed into a respective independent clause, e.g., Clause A, B, or C.

Clause 1: the head-mountable device further comprises: a camera; an eye sensor; a microphone; a speaker; and a battery.

Clause 2: the multiple arms comprise: a first arm; and a second arm; and the multiple HMD connectors comprise: multiple first HMD connectors on the first arm; and multiple second HMD connectors on the second arm.

Clause 3: each of the HMD connectors comprises an attachment element and a communication interface.

Clause 4: the attachment element comprises: a shear lock element configured to limit movement of a corresponding one of the end portions of the accessory device across a surface of the corresponding one of the arms; and a positioning element configured to limit movement of a corresponding one of the end portions of the accessory device away from the surface of the corresponding one of the arms.

Clause 5: the positioning element comprises a magnet.

Clause 6: the accessory device further comprises an accessory component, wherein, when the HMD connectors are engaged with the accessory connectors, the processor is operably connected to the accessory component via the HMD connectors and the accessory connectors.

Clause 7: the accessory component comprises a sensor.

Clause 8: the accessory component comprises a battery.

Clause 9: the external device is a wearable device.

Clause 10: each of the HMD connectors comprises an attachment element and a communication interface.

Clause 11: the attachment element comprises: a shear lock element configured to limit movement of the accessory connector of the accessory device across a surface of the corresponding one of the arms; and a positioning element configured to limit movement of the accessory connector of the accessory device away from the surface of the corresponding one of the arms.

Clause 12: each of the arms comprises: an earpiece; a temple component between the frame and the earpiece, wherein the earpiece is rotatably coupled to the temple component by a hinge.

Clause 13: at least one of the HMD connectors is disposed on the earpiece and at least one of the HMD connectors is disposed on the temple component.

Clause 14: the multiple HMD connectors comprise a first HMD connector, a second HMD connector, and a third HMD connector, wherein the second HMD connector is between the first HMD connector and the third HMD connector.

Clause 15: a portion of each of the HMD connectors is retractable within the corresponding one of the arms.

Clause 16: each of the HMD connectors comprises an attachment element and a communication interface.

Clause 17: each of the HMD connectors is configured to connect to an external connector of an external device to provide operable communication between the head-mountable device and the external device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A system comprising:
a head-mountable device comprising:
  a frame;
  a processor;
  an optical module within the frame;
  multiple arms extending from the frame; and
  multiple HMD connectors each disposed at a corresponding one of the arms and comprising:
    a respective HMD positioning element; and
    a respective HMD communication interface; and
an accessory device comprising:
  multiple end portions at opposing ends of the accessory device; and
  multiple accessory connectors each disposed at a corresponding one of the end portions and comprising:
    a respective accessory positioning element configured to mechanically and releasably engage the respective HMD positioning element; and
    a respective accessory communication interface configured to communicate with the head-mountable device via the respective HMD communication interface,
  wherein the accessory device is configured to be arranged in:
    a first configuration with each of the accessory connectors engaged to a corresponding one of the HMD connectors to provide operable communication between the arms of the head-mountable device; and
    a second configuration with a first one of the accessory connectors engaged to a first one of the HMD connectors and a second one of the accessory connectors engaged to an external connector of an external device to provide operable communication between the head-mountable device and the external device.

2. The system of claim 1, wherein the head-mountable device further comprises:
  a camera;
  an eye sensor;
  a microphone;
  a speaker; and
  a battery.

3. The system of claim 1, wherein:
  the multiple arms comprise:
    a first arm; and
    a second arm; and
  the multiple HMD connectors comprise:
    multiple first HMD connectors on the first arm; and
    multiple second HMD connectors on the second arm.

4. The system of claim 1, wherein the respective HMD positioning element and the respective accessory positioning element each comprises a magnet.

5. The system of claim 1, wherein the accessory device further comprises an accessory component, wherein, when the HMD connectors are engaged with the accessory connectors, the processor is operably connected to the accessory component via the HMD connectors and the accessory connectors.

6. The system of claim 5, wherein the accessory component comprises a sensor.

7. The system of claim 5, wherein the accessory component comprises a battery.

8. The system of claim 5, wherein the external device is a wearable device.

9. The system of claim 1, wherein the respective HMD positioning element and the respective accessory positioning element each comprises a detent.

10. A head-mountable device comprising:
  a frame;
  a pair of arms extending from the frame;
  a processor;
  multiple HMD connectors disposed along each of the arms, each of the HMD connectors of a given one of the arms being disposed at a distance away from the frame that is different than a distance away from the frame for any other one of the HMD connectors of the given one of the arms, each of the HMD connectors comprising (1) a respective HMD positioning element configured to mechanically and releasably engage with a respective accessory connector of an accessory device and (2) a respective HMD communication interface configured to operably connect the processor to a respective accessory communication interface of the accessory device.

11. The head-mountable device of claim 10, wherein each of the arms comprises:
  an earpiece;
  a temple component between the frame and the earpiece, wherein the earpiece is rotatably coupled to the temple component by a hinge.

12. The head-mountable device of claim 11, wherein at least one of the HMD connectors is disposed on the earpiece and at least one of the HMD connectors is disposed on the temple component.

13. The head-mountable device of claim 10, wherein the multiple HMD connectors comprise a first HMD connector, a second HMD connector, and a third HMD connector, wherein the second HMD connector is between the first HMD connector and the third HMD connector.

14. The head-mountable device of claim 10, wherein the respective HMD positioning element comprises a magnet.

15. The head-mountable device of claim 10, wherein the respective HMD positioning element comprises a detent.

16. A head-mountable device comprising:

a frame;

a pair of arms extending from the frame;

an optical module within the frame; and multiple HMD connectors, each of the HMD connectors being disposed at a terminal end of a corresponding one of the arms, each of the HMD connectors being retractably extendible from the corresponding one of the arms by a respective tether, the HMD connectors comprising:

HMD positioning elements configured to mechanically and releasably engage each other; and HMD communication interfaces configured to communicate with each other.

17. The head-mountable device of claim 16, wherein a portion of each of the HMD connectors is retractable within the corresponding one of the arms.

18. The head-mountable device of claim 16, wherein each of the HMD connectors is configured to connect to an external connector of an external device to provide operable communication between the head-mountable device and the external device.

19. The head-mountable device of claim 16, wherein each of the HMD positioning elements comprises a magnet.

20. The head-mountable device of claim 16, wherein each of the HMD positioning elements comprises a detent.

\* \* \* \* \*